United States Patent
Chen et al.

(10) Patent No.: US 9,300,138 B2
(45) Date of Patent: Mar. 29, 2016

(54) SYSTEM AND METHOD FOR MANAGING POWER CONSUMPTION

(75) Inventors: Wei-Peng Chen, Fremont, CA (US); Koji Yoshimura, Tokyo (JP); Ryusuke Masuoka, San Jose, CA (US); Sung Lee, Palo Alto, CA (US)

(73) Assignee: Fujitsu Limited, Kawasaki-shi (JP)

(*) Notice: Subject to any disclaimer, the term of this patent is extended or adjusted under 35 U.S.C. 154(b) by 488 days.

(21) Appl. No.: 13/274,773

(22) Filed: Oct. 17, 2011

(65) Prior Publication Data
US 2012/0316695 A1 Dec. 13, 2012

Related U.S. Application Data

(60) Provisional application No. 61/494,069, filed on Jun. 7, 2011.

(51) Int. Cl.
*H02J 3/00* (2006.01)
*H02J 3/14* (2006.01)

(52) U.S. Cl.
CPC . *H02J 3/14* (2013.01); *H02J 3/008* (2013.01); *H02J 2003/143* (2013.01); *H02J 2003/146* (2013.01); *Y02B 70/3225* (2013.01); *Y02B 70/3266* (2013.01); *Y04S 20/222* (2013.01); *Y04S 20/224* (2013.01); *Y04S 20/242* (2013.01); *Y04S 50/10* (2013.01)

(58) Field of Classification Search
None
See application file for complete search history.

(56) References Cited

U.S. PATENT DOCUMENTS

| | | | | |
|---|---|---|---|---|
| 4,644,320 A | * | 2/1987 | Carr et al. | 340/12.37 |
| 4,771,185 A | * | 9/1988 | Feron et al. | 307/39 |
| 5,481,140 A | * | 1/1996 | Maruyama et al. | 307/11 |
| 5,572,438 A | * | 11/1996 | Ehlers et al. | 700/295 |
| 6,925,363 B2 | * | 8/2005 | Hutton | 700/295 |
| 7,062,361 B1 | * | 6/2006 | Lane | 700/295 |
| 7,373,222 B1 | * | 5/2008 | Wright et al. | 700/295 |
| 7,580,775 B2 | * | 8/2009 | Kulyk et al. | 700/296 |
| 7,839,275 B2 | | 11/2010 | Spalink et al. | |

(Continued)

FOREIGN PATENT DOCUMENTS

| | | | | |
|---|---|---|---|---|
| EP | 0 208 597 A1 | | 1/1987 | H02J 3/14 |
| WO | WO 2009085610 A2 | * | 7/2009 | |

OTHER PUBLICATIONS

Notification of Transmittal of the International Search Report and the Written Opinion of the International Searching Authority, or the Declaration; International Application No. PCT/US2012/040655; International Filing Date: Jun. 4, 2012, Date of Mailing Nov. 5, 2012.

(Continued)

*Primary Examiner* — Christopher E Everett
(74) *Attorney, Agent, or Firm* — Baker Botts L.L.P.

(57) ABSTRACT

In accordance with particular embodiments, a method for managing power consumption includes receiving from a plurality of electricity relays an indication of a current state associated with each of the plurality of electricity relays. The method also includes receiving a power rate associated with a cost of power. The method further includes determining a threshold state based on the power rate and the current state associated with each of the plurality of electricity relays. The method additionally includes transmitting one or more control requests to one or more of the plurality of electricity relays. A first control request transmitted to a first electricity relay is based on the threshold state and a first current state associated with the first electricity relay.

75 Claims, 3 Drawing Sheets

(56) References Cited

U.S. PATENT DOCUMENTS

| | | | |
|---|---|---|---|
| 7,917,251 B2* | 3/2011 | Kressner et al. | 700/286 |
| 7,991,513 B2* | 8/2011 | Pitt | 700/295 |
| 8,178,997 B2* | 5/2012 | Talkin et al. | 307/41 |
| 8,228,034 B2* | 7/2012 | Guatto et al. | 320/132 |
| 2004/0148060 A1* | 7/2004 | Lee | 700/295 |
| 2004/0254654 A1* | 12/2004 | Donnelly et al. | 700/22 |
| 2005/0033707 A1* | 2/2005 | Ehlers et al. | 705/412 |
| 2007/0043478 A1* | 2/2007 | Ehlers et al. | 700/276 |
| 2008/0039979 A1* | 2/2008 | Bridges et al. | 700/292 |
| 2008/0046387 A1* | 2/2008 | Gopal et al. | 705/412 |
| 2009/0018706 A1* | 1/2009 | Wittner | 700/295 |
| 2009/0040029 A1* | 2/2009 | Bridges et al. | 340/310.11 |
| 2009/0094173 A1* | 4/2009 | Smith et al. | 705/412 |
| 2010/0117620 A1* | 5/2010 | Veskovic et al. | 323/318 |
| 2010/0138363 A1* | 6/2010 | Batterberry et al. | 705/412 |
| 2010/0145535 A1* | 6/2010 | Tyler et al. | 700/292 |
| 2010/0174667 A1* | 7/2010 | Vitale et al. | 705/412 |
| 2010/0174668 A1* | 7/2010 | Finch et al. | 705/412 |
| 2010/0179704 A1* | 7/2010 | Ozog | 700/291 |
| 2010/0187219 A1* | 7/2010 | Besore et al. | 219/494 |
| 2010/0235008 A1* | 9/2010 | Forbes et al. | 700/291 |
| 2011/0004358 A1* | 1/2011 | Pollack et al. | 700/297 |
| 2011/0016063 A1* | 1/2011 | Pollack | B60L 11/1824 705/412 |
| 2011/0078092 A1* | 3/2011 | Kim et al. | 705/412 |
| 2011/0118894 A1* | 5/2011 | Reineccius et al. | 700/296 |
| 2011/0133558 A1* | 6/2011 | Park | 307/66 |
| 2011/0153107 A1* | 6/2011 | Kim et al. | 700/295 |
| 2011/0204720 A1* | 8/2011 | Ruiz et al. | 307/66 |
| 2011/0218690 A1* | 9/2011 | O'Callaghan et al. | 700/295 |
| 2011/0251731 A1* | 10/2011 | Yang et al. | 700/296 |
| 2012/0101646 A1* | 4/2012 | Nydegger et al. | 700/291 |
| 2012/0101651 A1* | 4/2012 | Haynes | 700/295 |
| 2012/0123604 A1* | 5/2012 | Littrell | 700/295 |

OTHER PUBLICATIONS

Yamato Thinking, Archive for May 13, 2011, Peak Shift with Power Manager, May 13, 2011.

Murthy et al., "Laptop Charging Strategies for Demand Response," Jun. 1, 2011.

Krioukov et al., "Green Millennium Personalized Lighting Controls," Jun. 2011.

EPO Office Action re Application No. 12 728 339.8-1806, Ref. No. P122716EPPC/CXG dated Dec. 3, 2014 (4 pages).

T. Kurihara et al., "Power squeeze good news for some / Scene set for summer boom in business-to-business trade of energy-saving gadgets," Daily Yomiuri Online, The Daily Yomiuri, http://www.yomiuri.co.jp/dy/business/T110509004733.htm; document dated May 10, 2011, printed off the Internet Aug. 2, 2011, 4 pages.

Communication pursuant to Article 94(3) EPC, European Patent Office, Reference No. P122716EPPC/CXG, Dated Sep. 8, 2015, 3 pages.

* cited by examiner

SYSTEM AND METHOD FOR MANAGING POWER CONSUMPTION

CROSS-REFERENCE TO RELATED APPLICATION

This application claims priority under 35 U.S.C. §119(e) to U.S. Provisional Application Ser. No. 61/494,069 filed Jun. 7, 2011, which is hereby incorporated by reference in its entirety.

TECHNICAL FIELD OF THE INVENTION

This invention relates in general to a system and method for managing power consumption.

BACKGROUND OF THE INVENTION

Various industries are striving to find solutions to reduce power bills despite increasing electricity rates. Demand Response (DR) is one such method. DR works to reduce the amount of power consumed during a peak load period. DR systems help utility companies avoid blackouts, defer construction of new generation/transmission facilities, and reduce costs. For consumers, DR systems help reduce electricity bills by reducing the amount of power consumed during the more costly peak load periods.

In many cases, office buildings are considered as a single consumer from the perspective of the utility company. The building owners typically provide a comprehensive electricity service to their tenants who pay a fixed fee for the administration and power service. The electricity programs for office buildings may often include both power consumption charges (e.g., the power rate (cost per kilowatt hour)*power consumption) and demand charges (e.g., based on the peak load (in unit of kW) within a billing period). Thus, the more power that is used during the peak hours, the higher the electricity bill is for the building.

SUMMARY

In accordance with particular embodiments, a method for managing power consumption includes receiving from a plurality of electricity relays an indication of a current state associated with each of the plurality of electricity relays. The method also includes receiving a power rate associated with a cost of power. The method further includes determining a threshold state based on the power rate and the current state associated with each of the plurality of electricity relays. The method additionally includes transmitting one or more control requests to one or more of the plurality of electricity relays. A first control request transmitted to a first electricity relay is based on the threshold state and a first current state associated with the first electricity relay.

Technical advantages of particular embodiments may include decreasing the amount of power consumed by a particular business entity. Accordingly, the business entity may reduce their power bill and decrease their environmental impact. Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
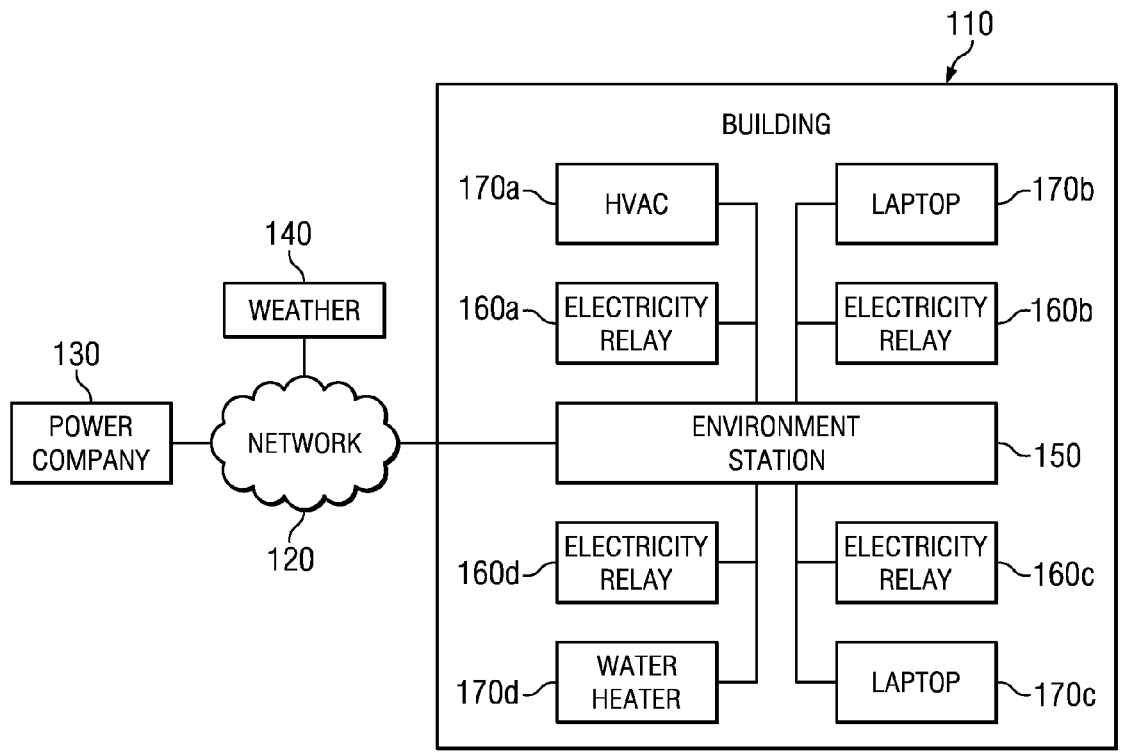
FIG. 1 illustrates a power consumption management system, in accordance with particular embodiments.

FIG. 1 illustrates a power consumption management system, in accordance with particular embodiments. The business entity (e.g., the owner) responsible for managing building 110 may install environment station 150 to help manage the power consumption of building 110. Environment station 150 may help to reduce the bill for building 110. Environment station 150 may leverage existing information technology resources of the business entity to allow the business entity to control or manage its power consumption without having to rely on the utility company or a third party service provider to control the business entities power consumption. In doing so, environment station 150 may consider the demand rate, the current power usage, the power rate, and/or the peak usage.

Building 110 may be an office building, a commercial building, an industrial building, a warehouse building, a residential building, a factory, multiple buildings within a single campus, or any other configuration in which it may suitable to have one or more environment stations 150 manage power consumption for various devices within building 110. Regardless of the configuration of building 110, it may comprise a number of devices that consume electricity. For example, lights, computers, various appliances (e.g., HVAC systems, water heaters, ovens and microwaves, etc.) and electronics (e.g., televisions, telecommunications equipment, networking equipment, signs, routers, etc.). Some of the devices within building 110 may be able to store energy, for example thermal energy or electrical charge, and thus may operate without having electricity or power continuously flowing thereto. Environment station 150 may be configured to manage power consumption, via electricity relays 160, for one or more devices 170 with an ability to store energy.

Environment station 150 may include any combination of hardware, software embedded in a computer readable medium, and/or encoded logic incorporated in hardware or otherwise stored (e.g., firmware) to implement any number functions to manage the consumption of power by devices 170 of building 110. In certain embodiments, environment station 150 may implement its power consumption management so as to minimize the impact to normal office operations. For example, environment station 150 may consider shedding demand from reducible loads and/or deferrable loads during peak hours. Reducible loads are those loads that can be turned off without negatively impacting, beyond acceptable parameters, the operations of building 110 (e.g., turning off lights in unoccupied rooms). Deferrable loads are those loads with the capability of storing energy (e.g., in a battery) or delaying a load within delay tolerances (e.g., within a number of degrees of a desired temperature). For example, a laptop may be a deferrable load because laptops may use either power provided directly from an outlet or it may defer from using power from the outlet and instead use power stored in its battery.

In FIG. 1, building 110 is connected to network 120. Network 120 may be any network or combination of networks capable of transmitting signals, data, and/or messages, including signals, data or messages transmitted through WebPages, e-mail, text chat, voice over IP (VoIP), and instant messaging. Network 120 may include one or more LANs, WANs, MANs, PSTNs, WiMAX networks, global distributed networks such as the Internet, Intranet, Extranet, or any other form of wireless or wired networking. Network 130 may use any of a variety of protocols for either wired or wireless communication.

In certain embodiments, network 120 may connect environment station 150 with power company 130 and weather information provider 140. Information provided by power company 130 and weather information provider 140 may be collected, processed, and/or distributed (e.g., distributed among electricity relays 160) in order to provide power management for devices 170. Depending on the embodiment and/or scenario, power company 130 may provide environment station 150 with information such as the current power rate, the current demand rate, any special circumstances (e.g., special demand response rates), or any other information (e.g., prior peak loads, current power consumption, etc.) which may be helpful to environment station 150 in managing the power consumption of building 110. As used herein, the power rate may be used to generally refer to the information provided by the power company regarding the cost of power. Depending on the power company, the power rate may include an power rate (e.g., the cost per kilowatt hour), a demand rate (e.g., the cost per kilowatt based on the peak load within a given period, such as a billing period), and/or any other rates or information that may impact the cost of power. Depending on the embodiment and/or scenario, weather information provider 140 may provide environment station 150 with information such as the current temperature, forecasted temperature, or any other information (e.g., historical weather information for the same day or time, etc.) which may be helpful to environment station 150 in managing the power consumption of building 110.

Depending on the configuration of the power management system, environment station 150 may provide power management in a centralized, distributed, or hybrid configuration. The type of configuration may be a balance between communication overhead (between environment station 150 and electricity relays 160) and the amount of control that is desired.

In a centralized configuration, environment station 150 may receive information from power company 130 (e.g., power rate, demand rate, etc.) and from weather information provider 140 (e.g., current temperature, forecasted temperature, etc.). Environment station 150 may also receive information from electricity relays 160. The information from electricity relays 160 may comprise the amount of power consumed by the associated device 170 (e.g., electricity relay 160*d* may provide information regarding the power consumed by device 170*d*), the current state of the associated device (e.g., the temperature of the water of a water heater or the state of charge (SOC) of a battery of a laptop, etc.), commands or requests provided by a user of the associated device (e.g., an override command), or any other information which may be helpful to environment station 150 in managing the power consumption of devices 170. Although not depicted, environment station 150 may also receive information regarding power consumed by other devices or components within building 110. Based on the received information, environment station 150 may identify particular devices for which the flow of power should be stopped or resumed. Environment station 150 may then send messages to the individual electricity relays 160 indicating whether they are to stop or allow the flow of power to the associated device compared to the other configurations. This configuration may provide a higher level of control, and thus may provide better power reductions, but may require more signaling overhead between components.

In a distributed configuration, environment station 150 may provide electricity relays 160 with information regarding the amount of power being used by building 110 (e.g., based on devices 170 and/or other devices within building 110). Environment station 150 may also provide electricity relays 160 with a power rate associated with a cost of power. The power rate may be provided by power company 120 and may vary over time. In some embodiments, environment station 150 may also provide electricity relays 160 with weather information. Electricity relays 160 may also receive a message regarding, or may otherwise determine, a state associated with a corresponding device 170. The state may be based on, or represent, a percentage of available capacity or it may be a ratio of, or difference between, a current parameter to an ideal parameter (e.g., the current temperature to a desired temperature). Based on this information, each electricity relay 160 may make its own determination, independent of the other electricity relays 160, as to whether to allow power to flow to the corresponding device 170. In this configuration, there is a relatively low amount of overhead because environment station 150 only provides the power usage and power rate information (and in some embodiments weather information). In some scenarios, the electricity relays do not need to send any information to the environment station. On the other hand, because each electricity relay 160 is independently making its own decision, environment station 150 may have relatively little control over how building 110 consumes power.

In a hybrid configuration, environment station 150 may receive power rate information from power company 130 and weather information from weather information provider 140. Environment station 150 may use the information along with one or more control parameters received from an operator (e.g., a system or building administrator responsible for managing the power consumption of building 110) to generate one or more threshold values. Environment station 150 may transmit the one or more thresholds to electricity relays 160. Electricity relays 160 may compare a state associated with the corresponding device 170 with the received thresholds to determine when to allow power to flow to the corresponding device 170. For example, in some embodiments, environment station 150 may determine two thresholds. If the state of the corresponding device 170 is above an upper threshold, electricity relay 160 may stop the flow of power to the corresponding device 170; if the state is below a lower threshold, electricity relay 160 may start allowing power to flow to the corresponding device 170; and if the state is between the two thresholds, electricity relay 160 may stop the flow of power to the corresponding device 170 and/or may start a back-off timer before resuming the flow of power to the corresponding device 170. Each electricity relay 160 may use a different or random length back-off timer to help reduce the number of devices 170 that begin receiving power at the same time.

In a hybrid configuration, environment station 150 may have greater control over the power consumption of devices 170 than in the distributed configuration because the environment station 150 can adjust the various thresholds to affect the power consumption of building 110. However, it may not have the same level of control as the centralized configuration because environment station 150 may not send individual commands to individual electricity relays 160. The hybrid configuration may also have a lower overhead than the centralized configuration because individual electricity relays 160 may not send information to environment station 150 nor may environment station 150 individually signal each electricity relay 160 when to stop and when to allow the flow of power to the corresponding device 170. However, as discussed above, the hybrid configuration may not provide the same level of control as the centralized configuration.

Depending on the type of device 170 and/or the control scheme used by environment station 150, the management of power consumption may include more than deciding whether to stop or allow the flow of power to the device. For example, environment station 150 may determine to reduce the amount of power that the device consumes. For example, environment station 150 may decide to lower the CPU speed of computers (e.g., desktop or laptop). As another example, environment station 150 may determine to lower the brightness of lights, signs, or display devices. As another example, environment station 150 may decide to adjust the duration of inactivity of a computer before the computer enters a hibernation state. As another example, environment station 150 may decide to reduce the amount of power provided to an HVAC unit to allow the HVAC unit to provide cool air that is not quite as cool as if the HVAC unit was able to receive full power.

In certain embodiments, an operator responsible for managing the power consumption of building 110 may adjust the control parameter to modify the various thresholds. This may provide the operator with the ability to control the level of conservation with which environment station 150 manages power consumption for building 110. The control parameter may be adjusted in any of the configurations. In the distributed configuration, environment station 150 may distribute any adjustments to the control parameter to electricity relays 160.

In certain embodiments, the threshold values used in any of the configurations may also be adjusted in a dynamic manner based on the peak load and the current load. For example, in some instances, power company 130 may base the power rate on the time that the power is consumed, as well as the peak load consumed by building 110 during a particular cycle, such as a billing cycle. In some instances, environment station 150 (and/or electricity relays 160) may attempt to limit the power consumption so as to minimize the peak load generated by building 110. This may be done by adjusting one or more thresholds so as to limit the amount of power that is consumed at any given time. In certain embodiments, the threshold may be reduced quickly as the power consumption reaches a peak load (e.g., a previous peak load within the same current cycle). Then, as the current load decreases, power station 150 may gradually increase the threshold back up.

Devices 170 may comprise any of a variety of different types of devices able to store energy. The depicted devices include HVAC device 170a, laptop devices 170b and 170c, and water heater 170d. The energy may be stored in any of a variety of different ways. For example, laptops 170b and 170c may store energy within their batteries. HVAC device 170a may store energy in the temperature of the rooms. Water heater device 170d may store energy in the water held within water heater 170d. Because devices 170 are able to store energy, in one form or another, building 110 may continue to function within acceptable parameters even though power may not be flowing to some of the corresponding devices 170. For example, water heater 170d may not need to continually heat the water if the water is already hot. Another example, HVAC 170a may lower the temperature of building 110 a few degrees below a threshold before a peak load period and then may allow the temperature to rise a few degrees above a threshold during the peak load period. Similarly, laptops 170b and 170c may store power in their batteries and then can run on battery power during at least a portion of a peak load period. Although particular devices 170 have been depicted, other devices capable of storing energy in one form or another may also be controlled by environment station 150. In some embodiments, device 170 may include the logic used to control the flow of power. For example, if electricity relay 160c is integrated into laptop 170C, the processor of laptop 170c may be used in providing the decision for when to allow the flow of power to laptop 170c.

Electricity relays 160 may include any combination of hardware, software embedded in a computer readable medium, and/or encoded logic incorporated in hardware or otherwise stored (e.g., firmware) to implement any number of functions that allow electricity relays 160 to control the flow of power to their associated devices 170. Electricity relays 160 may be able to communicate with environment station 150 and a corresponding device 170. Electricity relays 160 may control the flow of power to the corresponding device 170. The flow of power may be based on information or requests provided by environment station 150. The information provided may vary depending upon the configuration of environment station 150 and electricity relays 160.

Depending upon device 170, electricity relay 160 may be an external component or an internal component to the corresponding device 170. For example, electricity relay 160a may be an external component to HVAC 170a, such as a standalone device functionally located between a power source and HVAC 170a. Alternatively, electricity relay 160A may be integrated into a thermostat associated with HVAC 170a. As another example, electricity relay 160b may be a component of the power adapter used to convert AC power from building 110 to DC power for laptop 170b.

In another scenario, electricity relay 160b may be integrated into laptop 170b. In yet another scenario, electricity relay 160b may be a standalone device, integrated into an outlet or powerstrip, or otherwise electrically positioned a power source and laptop 170b. In some embodiments, electricity relay 160 may control the flow of power based on information provided by the corresponding device 170. For example, the corresponding device 170 may provide electricity relay 160 with information regarding the state of the device. For example, laptop 170b may communicate the state of charge of laptop 170b's battery to electricity relay 160b. As another example, water heater 170d may provide electricity relay 160d with the state of the temperature of the water within water heater 170d.

Power company 130 may be a utility company responsible for providing electrical power for one or more buildings, such as building 110. Power company 130 may charge building 110 for the power it consumes on a dynamic basis. For example, depending on the time of day, the power rate (e.g., the cost per kilowatt hour) may vary. The power rate charged to building 110 may also vary depending on the demand rate (e.g., the cost per kilowatt during peak demand). For example, the higher the highest peak within a billing cycle is, the higher the demand rate for that billing cycle. In some instances, the power rate may vary depending on the demand on the utility company by multiple buildings. That is, as more electricity is being consumed, the rate for electricity may increase. As another example, the rate may increase as the amount of power being produced decreases. For example, where a power company uses windmills to generate power, the power may be more expensive on a non-windy day than on a windy day. Power company 130 may be able to communicate the power rate and/or the demand rate to environment station 150. The information may be communicated through, for example, network 120.

Weather information provider 140 may be able to provide environment station 150 with a variety of different types of weather information. For example, weather information provider 140 may provide current temperature, forecasted temperature, cloud cover, rain, or any other weather indicator which may be suitable for environment station 150 to consider in determining, or predicting, how to manage power consumption and/or when there might be a spike in load. For example, if the forecast is for a high temperature, environment station 150 may predict an increased HVAC load as building 110 runs the air conditioning to cool down building 110. Based on this determination, environment station 150 may, for example, lower one or more thresholds to delay when laptops stop using their battery and begin using AC power. Environment station 150 may also pre-heat, or pre-cool, building 110 in anticipation of a predicted spike in power consumption by building 110.

Although the embodiment depicted in FIG. 1 illustrates a particular number, type, and configuration of electricity relays and devices, other embodiments contemplate any number or arrangement of such components. In addition, the elements may include components centrally located (local) with respect to one another or distributed throughout building 110 and/or outside building 110.

Figure 2:
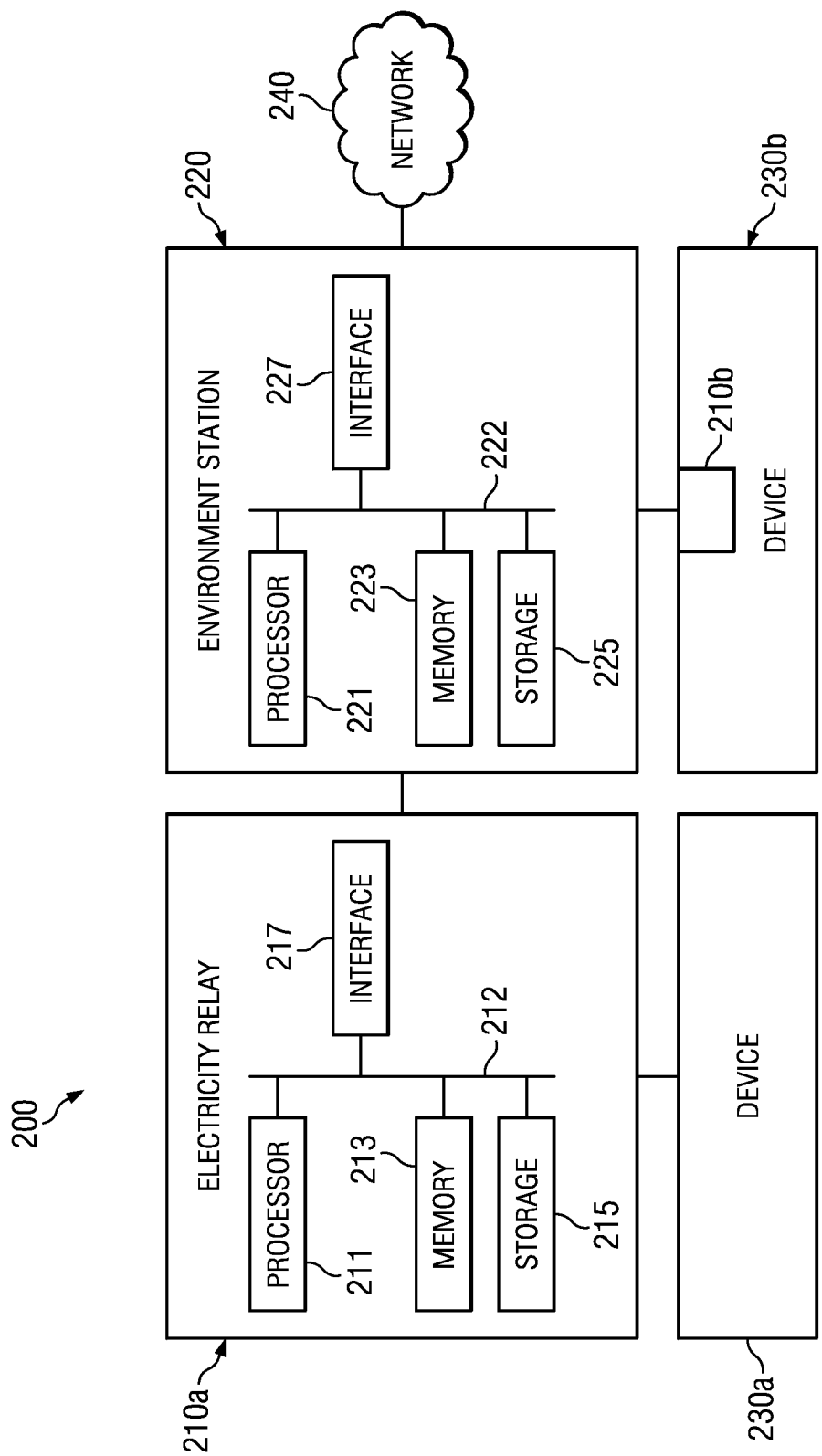
FIG. 2 illustrates a detailed block diagram of an electricity relay and an environment station in a power consumption management system, in accordance with particular embodiments.

FIG. 2 illustrates a detailed block diagram of an electricity relay and an environment station in a power consumption management system, in accordance with particular embodiments. Power consumption management system 200 may be used to manage power consumption for a variety of different devices including, but not limited to, laptops, uninterruptable power supplies (UPSs) and devices connected thereto, water heaters, HVAC units, or any other devices capable of storing energy. Power consumption management system 200 includes electricity relays 210 and environment station 220. Electricity relays 210 may be external or internal to the corresponding device 230 to which electricity relays 210 control the flow of power. For example, electricity relay 210*a* is external to device 230*a* and electricity relay 210*b* is internal to device 230*b*.

Electricity relays 210 and environment station 220 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of electricity relays 210 and environment station 220 may comprise any suitable physical form, configuration, number, type and/or layout. As an example, and not by way of limitation, electricity relays 210 and/or environment station 220 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, electricity relays 210 and/or environment station 220 may include one or more computer systems; be unitary or distributed; span multiple locations; span multiple machines; or reside in a cloud, which may include one or more cloud components in one or more networks.

Where appropriate, one or more components of power consumption management system 200 may perform without substantial spatial or temporal limitation one or more steps of one or more methods described or illustrated herein. As an example, and not by way of limitation, power consumption management system 200 may perform in real time or in batch mode one or more steps of one or more methods described or illustrated herein. One or more power consumption management systems may perform at different times or at different locations one or more steps of one or more methods described or illustrated herein, where appropriate.

In the depicted embodiment, electricity relay 210*a* and environment station 220 each include their own respective processors 211 and 221, memory 213 and 223, storage 215 and 225, interfaces 217 and 227, and buses 212 and 222. These components may work together to manage a building's power consumption by managing the flow of power to one or more devices, such as devices 230*a*. Although a particular power consumption management system is depicted having a particular number of particular components in a particular arrangement, this disclosure contemplates any suitable power consumption management system 200 having any suitable number of any suitable components in any suitable arrangement. For simplicity, similar components of electricity relay 210*a* and environment station 220 will be discussed together wherein the components of environment station 220 will be identified in parenthesis. However, it is not necessary for both devices to have the same components, or the same type of components. For example, processor 211 may be a general purpose microprocessor and processor 221 may be an application specific integrated circuit (ASIC).

Processor 211 (and/or 221) may be a microprocessor, controller, or any other suitable computing device, resource, or combination of hardware, software and/or encoded logic operable to provide, either alone or in conjunction with other components, (e.g., memory 213 or 223, respectively) power consumption management functionality. Such functionality may include processing power rate information provided by a utility company to determine when to allow and when to prevent the flow of power to, for example, device 230*a*. The functions performed by the components of electricity relay 210 and environment station 220 may vary depending on the configuration of power consumption management system 200. For example, in a centralized configuration, processor 221 may use the current power rate information as well as state information associated with device 230*a* to determine whether electricity relay 210*a* should stop the flow of power to device 230*a*. As another example, in a distributed configuration, processor 211 may use the current power rate information as well as state information associated with device 230*a* to determine whether electricity relay 210*a* should stop the flow of power to device 230*a*. Additional examples and functionality provided, at least in part, by processor 211 (and/or 221) will be discussed below.

In particular embodiments, processor 211 (and/or 221) may include hardware for executing instructions, such as those making up a computer program. As an example and not by way of limitation, to execute instructions, processor 211 (and/or 221) may retrieve (or fetch) instructions from an internal register, an internal cache, memory 213 (and/or 223), or storage 215 (and/or 225); decode and execute them; and then write one or more results to an internal register, an internal cache, memory 213 (and/or 223), or storage 215 (and/or 225).

In particular embodiments, processor 211 (and/or 221) may include one or more internal caches for data, instructions, or addresses. This disclosure contemplates processor 211 (and/or 221) including any suitable number of any suitable internal caches, where appropriate. As an example and not by way of limitation, processor 211 (and/or 221) may include one or more instruction caches, one or more data caches, and one or more translation lookaside buffers (TLBs). Instructions in the instruction caches may be copies of instructions in memory 213 (and/or 223) or storage 215 (and/or 225) and the instruction caches may speed up retrieval of those instructions by processor 211 (and/or 221). Data in the data caches may be copies of data in memory 213 (and/or 223) or storage 215 (and/or 225) for instructions executing at processor 211 (and/or 221) to operate on; the results of previous instructions executed at processor 211 (and/or 221) for access by subsequent instructions executing at processor 211 (and/or 221), or for writing to memory 213 (and/or 223), or storage 215 (and/or 225); or other suitable data. The data caches may speed up read or write operations by processor 211 (and/or 221). The TLBs may speed up virtual-address translations for processor 211 (and/or 221). In particular embodiments, processor 211 (and/or 221) may include one or more internal registers for data, instructions, or addresses. Depending on the embodiment, processor 211 (and/or 221) may include any suitable number of any suitable internal registers, where appropriate. Where appropriate, processor 211 (and/or 221) may include one or more arithmetic logic units (ALUs); be a multi-core processor; include one or more processors 211 (and/or 221); or any other suitable processor.

Memory 213 (and/or 223) may be any form of volatile or non-volatile memory including, without limitation, magnetic media, optical media, random access memory (RAM), read-only memory (ROM), flash memory, removable media, or any other suitable local or remote memory component or components. In particular embodiments, memory 213 (and/or 223) may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 (and/or 223) may include one or more memories 213 (and/or 223), where appropriate. Memory 213 (and/or 223) may store any suitable data or information utilized by electricity relay 210a (and/or environment station 220), including software embedded in a computer readable medium, and/or encoded logic incorporated in hardware or otherwise stored (e.g., firmware). In particular embodiments, memory 213 (and/or 223) may include main memory for storing instructions for processor 211 (and/or 221) to execute or data for processor 211 (and/or 221) to operate on. In particular embodiments, one or more memory management units (MMUs) may reside between processor 211 (and/or 221) and memory 213 (and/or 223) and facilitate accesses to memory 213 (and/or 223) requested by processor 211 (and/or 221).

As an example and not by way of limitation, electricity relay 210 may load instructions from storage 215 (and/or 225) or another source (such as, for example, another computer system) to memory 213 (and/or 223). Processor 211 (and/or 221) may then load the instructions from memory 213 (and/or 223) to an internal register or internal cache. To execute the instructions, processor 211 (and/or 221) may retrieve the instructions from the internal register or internal cache and decode them. During or after execution of the instructions, processor 211 (and/or 221) may write one or more results (which may be intermediate or final results) to the internal register or internal cache. Processor 211 (and/or 221) may then write one or more of those results to memory 213 (and/or 223). In particular embodiments, processor 211 (and/or 221) may execute only instructions in one or more internal registers or internal caches or in memory 213 (and/or 223) (as opposed to storage 215 (and/or 225) or elsewhere) and may operate only on data in one or more internal registers or internal caches or in memory 213 (and/or 223) (as opposed to storage 215 (and/or 225) or elsewhere).

In particular embodiments, storage 215 (and/or 225) may include mass storage for data or instructions. As an example and not by way of limitation, storage 215 (and/or 225) may include a hard disk drive (HDD), a floppy disk drive, flash memory, an optical disc, a magneto-optical disc, magnetic tape, or a Universal Serial Bus (USB) drive or a combination of two or more of these. Storage 215 (and/or 225) may include removable or non-removable (or fixed) media, where appropriate. Storage 215 (and/or 225) may be internal or external to electricity relay 210 (and/or environment station 220), where appropriate. In particular embodiments, storage 215 (and/or 225) may be non-volatile, solid-state memory. In particular embodiments, storage 215 (and/or 225) may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 (and/or 225) may take any suitable physical form and may comprise any suitable number or type of storage. Storage 215 (and/or 225) may include one or more storage control units facilitating communication between processor 211 (and/or 221) and storage 215 (and/or 225), where appropriate.

In particular embodiments, interface 217 (and/or 227) may include hardware, encoded software, or both providing one or more interfaces for communication (such as, for example, packet-based communication) between electricity relay 210a, environment station 220, device 230a, any networks, any network devices, and/or any other computer systems. As an example and not by way of limitation, communication interface 217 (and/or 227) may include a network interface controller (NIC) or network adapter for communicating with an Ethernet or other wire-based network and/or a wireless NIC (WNIC) or wireless adapter for communicating with a wireless network.

Depending on the embodiment, interface 217 (and/or 227) may be any type of interface suitable for any type of network in which the components of power consumption management system 200 may be used. As an example, and not by way of limitation, the components of power consumption management system 200 may communicate with one another in an ad-hoc network, a personal area network (PAN), a local area network (LAN), a wide area network (WAN), a metropolitan area network (MAN), or through one or more portions of the Internet or a combination of two or more of these. One or more portions of one or more of these networks may be wired or wireless. One or more portions of one or more of these networks may use a proprietary protocol. For example, electricity relays 210 and environment station 220 may use a proprietary and/or ad-hoc protocol to communicate information amongst one another. The components of power consumption management system 200 may communicate with a wireless PAN (WPAN) (such as, for example, a BLUETOOTH WPAN), a Wi-Fi network, a WI-MAX network, an LTE network, an LTE-A network, a cellular telephone network (such as, for example, a Global System for Mobile Communications (GSM) network), or any other suitable wireless network or a combination of two or more of these. Electricity relay 210 (and/or environment station 220) may include any suitable interface 217 (and/or 227) for any one or more of these networks, where appropriate.

In some embodiments, interface 217 (and/or 227) may include one or more interfaces for one or more I/O devices. One or more of these I/O devices may enable communication between a person and electricity relay 210 (and/or environment station 220). As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 (and/or 227) for them. Where appropriate, interface 117 (and/or 227) may include one or more drivers enabling processor 211 (and/or 221) to drive one or more of these I/O devices. Interface 117 (and/or 227) may include one or more interfaces 117 (and/or 227), where appropriate.

Bus 212 (and/or 222) may include any combination of hardware, software embedded in a computer readable medium, and/or encoded logic incorporated in hardware or otherwise stored (e.g., firmware) to couple components of electricity relay 210 (and/or environment station 220) to each other. As an example and not by way of limitation, bus 212 (and/or 222) may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 (and/or 222) may include any number, type, and/or configuration of buses 212 (and/or 222), where appropriate. In particular embodiments, one or more buses 212 (which may each include an address bus and a data bus) may couple processor 211 (and/or 221) to memory 213 (and/or 223). Bus 212 (and/or 222) may include one or more memory buses.

Herein, reference to a computer-readable storage medium encompasses one or more tangible and non-transitory computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Particular embodiments may include one or more computer-readable storage media implementing any suitable storage. In particular embodiments, a computer-readable storage medium implements one or more portions of processor 211 (and/or 221) (such as, for example, one or more internal registers or caches), one or more portions of memory 213 (and/or 223), one or more portions of storage 215 (and/or 225), or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

The following explanation may provide additional detail as to some of the components and features of power consumption management system 200. The illustrated components of power consumption management system 200 may allow an owner or manager of a building, campus, or business (generally referred to as a building) to build and/or operate their own power consumption management system within their building to control the flow of power to devices having a deferrable load. In particular embodiments, the power demand of devices 230 may be considered as a value which can be controlled by environment station 220. Processor 221 may control the power usage of devices 230 via one or more thresholds. Interface 227 may broadcast the one or more thresholds to electricity relays 210.

The control may be implemented through environment station 220 and electricity relays 210 located within the building. This may be done using existing building infrastructure. The flow of power may be controlled to limit the power used by the controlled devices when other heavy loads (e.g. the air conditioning) are consuming power, or during peak hours when the power rate is high. In some embodiments, the management may involve pre-storing energy in the device before peak hours (e.g., charging batteries, lowering or raising a temperature), selectively allowing power to flow to devices to avoid having power flow to all the devices simultaneously, deferring the flow of power until after peak hours, reducing the amount of power that flows to devices, or a combination of any of the above.

Power consumption management system 200 may be arranged in a variety of configurations including a distributed configuration, a centralized configuration, and a hybrid configuration. The different configurations may represent a balance between the amount of control over the devices and the amount of signaling overhead.

In a distributed configuration, interface 227 of environment station 220 may periodically announce (e.g., broadcast over a LAN) overall building power usage (e.g., in kW) and the aggregated power usage of devices 230 (e.g., via sub-meters associated with devices 230). Interface 217 of electricity relay 210a may receive the announcement from environment station 220 and pass this information to memory 213 or storage 215. Interface 217 may also receive power rate information and store it in memory 213 or storage 215. The power rate information may be received from a utility company via network 240 or it may be received from environment station 220. Also stored in memory 213 or storage 215 may be the state (e.g., the charge or temperature) associated with device 230a. Processor 211 may then use the information stored in memory 213 or storage 215 to decide whether to stop or allow power to flow to device 230a. A distributed configuration provides simple and low communication overheads but provides limited control over the actual consumption of power.

In one embodiment of a centralized configuration, interface 227 may periodically receive information regarding the state associated with devices 230. This information may be received from devices 230 or from electricity relays 210. The state information for the different devices may be stored in memory 223 or storage 225. Processor 221 may then sort the devices based on their state (e.g., in decreasing order of their state). Processor 221 may then analyze the sorted list to determine a threshold value such that a desired number of devices have a state that is above or below the threshold. Interface 227 may then broadcast the threshold to electricity relays 210. In some embodiments, interface 227 may send individual instructions to specific electricity relays 210 requesting that they allow or stop the flow of power. In embodiments in which environment station 220 broadcasts a threshold, processor 211 of electricity relay 210a may then compare the received threshold to a state associated with device 230a to determine whether to stop or allow the flow of power to device 230a.

In some embodiments, processor 211 may also consider one or more self-protection mechanisms that may be stored in memory 213 or storage 215. The self-protection mechanisms may be provided in case communication is lost between electricity relay 210a and environment station 220. For example, the protection mechanisms may specify that electricity relay 210a shall allow power to flow to device 230a automatically if its state is below a lower threshold and electricity relay 210a shall automatically stop the flow of power to device 230a if its state is above an upper threshold.

In some embodiments, environment station 220 may treat power consumption management as an optimization problem. In particular embodiments, because the control decisions may be made at different times based on different observation states, environment station 220 may treat power consumption management as a stochastic dynamic programming problem. One possible objective function may comprise processor 221 minimizing the electricity bill for the building based on the power rate associated with the building. For example, an objective function that takes into account the power rate and the demand rate may be formulated as:

$$\min_{\{[r_{i,t}]\}} \left\{ \sum_{t=1}^{T} c_{et} \cdot \sum_{i=1}^{n} p_{i,t} \cdot r_{i,t} + c_d \cdot \max_{t=1\sim T} \left( \sum_{i=1}^{n} p_{i,t} \cdot r_{i,t} + B_t \right) \right\}.$$

In the above formula, T may represent the time of the control interval; n may represent the number of devices 230 being managed by environment station 220; $C_{et}$ may represent the power rate at time t (unit: \$/kWh); $P_{i,t}$ may represent the power consumed by device i at time t; $r_{i,t}$ may represent a control variable for device i being managed by environment station 220 at time t (e.g., if $r_{i,t}=1$, allow power to flow to device i; if $r_{i,t}=0$, stop the power from flowing to device i); $c_d$ may represent the demand rate for a billing cycle (unit: \$/kW); $B_t$ may represent the power load of all the devices (except the devices being managed by environment station 220) of the building at time t. In the objective function above, the first term may represent the impact of the power rate on the total power bill and the second term may represent the impact of the demand rate on the total power bill.

In certain embodiments, processor 221 may impose the following constraints on the objective function above: (1) the state associated with each device being managed by environment station 220 may be maintained between a lower threshold m, and an upper threshold M such that $m \leq SOC_{i,t} \leq M$, $\forall = 1\sim n$, $t=1\sim T$ where $SOC_{i,t}$ may represent the state of device i at time t; (2) a minimum state level of a device at the end of the control interval (e.g., a user can specify that by 6:00 p.m. the state of device i is at or above a minimum state level) such that $SOC_{i,T} \geq \beta_1$, $\forall i=1\sim n$ where $\beta i$ may represent the minimum SOC of device i at the end of the control interval; and (3) the power at each laptop may be balanced such that:

$$SOC_{i,t}=SOC_{i,t-1}+p_{i,t} \cdot r_{i,t}-u_{i,t}, \forall i=1\sim n, t=1\sim T$$

where $u_{i,t}$ may represent the power used by device i at time t.

In certain embodiments, different operators or managers of different buildings may wish to use different electricity rate programs which may lead to different optimization problems. For example, if real-time pricing is to be considered, the price of power, $c_{et}$, may change over time, otherwise $c_{et}$ may be a constant $c_e$. As another example, if the demand charge is not considered, the second term in the objective function can be removed and the optimization problem becomes simpler.

In some embodiments, such as where device 230 is a laptop, the power, $P_{i,t}$, consumed by the battery charger of the laptop may depend on the level of charge of the battery. Depending on the type of charging used, constant current phase or constant voltage phase, the power used may be different. In some embodiments, given the state of charge of the battery, the required charging power may be retrieved from a look-up table without adding extra complexity to the optimization problem. For example, if all the batteries' state of charge are below a certain threshold and in the fast charging mode (e.g., constant current charging phase), $P_{i,t}$ may be simplified as a constant P.

In some embodiments, processor 221 may be able to select among multiple levels (as opposed to a binary on/off) for allowing the flow of power to a device. For example, in some embodiments, the rate at which devices 230 adjust their state may vary (e.g., a battery charger may be able to charge the battery at different speeds or an HVAC unit may be able to control the amount of cold air that is added to a room). In such embodiments, $P_{i,t}$, and/or $r_{i,t}$, may be replaced. For example, the value of $P_{i,t}$ may be a continuous value within a specified range such that $p_c \leq p_{i,t} \leq P_c$, $\forall i=1\sim n$, $t=1\sim T$ or a discrete value of a set of values (e.g., charging rate values) such that $p_{i,t} \in \{P_c\}$, $\forall i=1\sim n$, $t=1\sim T$ After interface 217 of electricity relay 210a receives a broadcasted threshold, processor 211 may compare the threshold with the current state associated with device 230a. If the current state is greater than the threshold, then electricity relay 210a may stop the flow of power to device 230a. If the current state is less than the threshold then electricity relay 210a may allow power to flow to device 230a. In some embodiments, to avoid synchronized action among electricity relays 210, processor 211 may initiate a back-off timer before electricity relay 210a may stop and/or allow power to flow to device 230a. In some embodiments, the back-off time may comprise a random component to vary the amount of time. In some embodiments, in addition to or instead of being random, the back-off time may vary based on the state associated with a device. This may, for example, enable a device with a lower state to start receiving power sooner (e.g., by setting a shorter back-off time). In some embodiments, the value of the back-off time may be a function of the state of the device, SOC, the threshold received from environment station 220, η, and a back-off window size (e.g., a maximum back-off time), W, such that $$\text{back-off time} = U\left(\frac{SOC - \eta}{1 - \eta} \cdot W\right),$$

where $U(\cdot)$ is a uniform distribution function.

In some embodiments, two thresholds, $\eta_1$ and $\eta_2$, may be broadcast by interface 227 of environment station 220. This may enhance the control resolution of environment station 220. If processor 211 determines that device 230a's state is less than a lower threshold, $\eta_1$, electricity relay 210a may allow power to flow to device 230a. If processor 211 determines that device 230a's state is greater than an upper threshold, $\eta_2$, electricity relay 210a may stop the flow of power to device 230a. If processor 211 determines that device 230a's state is between the two thresholds, $\eta_1$ and $\eta_2$, electricity relay 210a may wait for a back-off amount of time before allowing power to flow to device 230a. In such an embodiment, the back-off time may be based on the following formula $$\text{back-off time} = \left(\left\lceil \frac{\eta_2 - SOC}{\eta_2 - \eta_1} \cdot W \right\rceil + U(1)\right) \cdot B,$$

where B is the basic back-off unit. The first term may be a deterministic value based on the state of device 230a and the second term may be a random value (e.g., between 0 and 1). In some embodiments, in addition to changing the thresholds, processor 221 may also change the values of W and B to further increase the flexibility of control.

In some embodiments, environment station 220 may try to limit the peak value of power consumed by the building within a control interval. As the power consumed by the building approaches or surpasses a peak load (e.g. when air conditioning is turned on), environment station 220 may reduce one or more charging thresholds. Lowering the threshold may stop the flow of power to one or more devices 230. The greater the drop in the threshold, the more devices for which power is likely to be stopped. As the power consumed by the building drops below the peak value, the one or more threshold may gradually be increased. In some embodiments, the decrease may be more dramatic than the increases. In such an embodiment, memory 223 or storage 225 may store a previously recorded peak load value (e.g., the highest peak of a previous interval or the highest peak so far within the current interval). Processor 221 may load this stored value and use it as an initial target peak load during the control interval. If the current power load consumed by the building exceeds the stored peak value, the stored peak value may be updated to reflect the current power load.

A hybrid configuration may include a lower communication overhead than a centralized configuration but may result in less control.

In some embodiments, memory 223 and/or 213, and/or storage 225 and/or 215 may store personal preferences for different users. This may allow for more customized control of the flow of power to specific devices 230. For example, each user can specify a desired state for their device at a particular time (e.g., a fully charged battery at 6:00 p.m.). As another example, devices 230 may have different modes of operation. For example, HVAC units or water heaters may have standard, economy, and/or performance modes; laptops or computers may include regular, computing, power saving, mobile, presentation, and/or gaming modes. Based on the different modes, the default thresholds may vary. In some embodiments, a quota value may be used in addition to a threshold. In such an embodiment, dynamic switching between different modes may be allowed by considering a quota limit. For example, if the power usage of a laptop is close to the quota limit, it is possible to change the mode of this laptop to power saving mode where more aggressive power saving such as reduced processor speed, dimmer display, shorter inactive time to enter hibernation, lower state threshold, etc. may be used.

In some embodiments, such as where the power company does not provide real-time power rate information, processor 221 may use data stored in memory 223 and/or storage 225 to predict or determine the real-time power rate.

Thus far, several different embodiments and features have been presented. Particular embodiments may combine one or more of these features depending on operational needs and/or component limitations. This may allow for great adaptability of a power consumption management system to the needs of various organizations and users. Some embodiments may include additional features.

Figure 3:
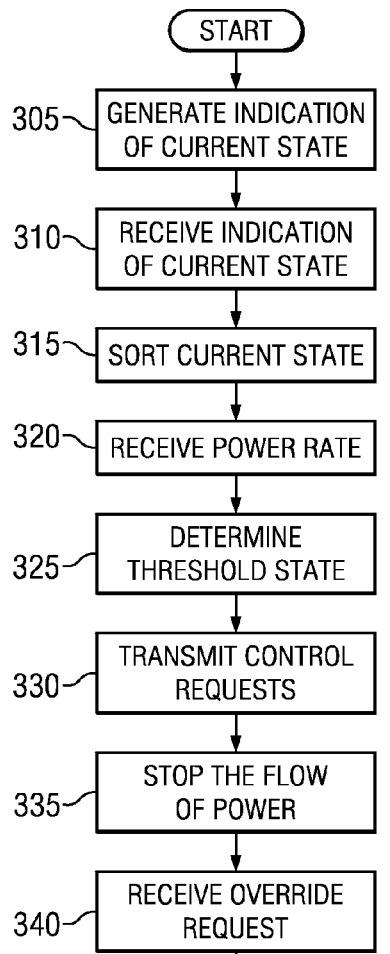

FIG. 3 illustrates a flow chart for a method for managing power consumption in a centralized configuration, in accordance with a particular embodiment. The steps in the depicted method may include steps performed by an environment station, such as environment station 150 or 220, as well as steps performed by electricity relays, such as electricity relays 160 or 210.

The method begins at step 305 where one or more electricity relays generate an indication of the current state of their associated device. For example, if the associated device is a laptop, the electricity relay may generate an indication of the state of charge of the battery of the laptop. The indication may be generated based on a message received from the associated device. For example, the laptop may send a message to the electricity relay that indicates the state of charge of the laptop's battery. In some embodiments, the current state may be generated based on information collected by the electricity relay. For example, based on the flow of power to the associated device through the electricity relay, the electricity relay may be able to determine the state associated with the device. In particular embodiments, the electricity relay may be a part of the device and thus may be able to determine the current state based on readings (e.g., from sensors) from within the device.

In some embodiments or scenarios, the indication of the current state of the device may be an indication of the energy stored by the device. For example, if the device is a water heater, the current state may be indicative of the current temperature of the water, how far the current temperature of the water is from a desired temperature of the water, an amount of hot water still left in the water heater (e.g., the water heater may stop the flow of cool water into the water heater during times when the power is off thus as hot water is used the water tank of the water heater will be drained), or any other metric or value which may used in determining the current state of the device. In some embodiments, the indication may be generated on a periodic basis, upon detecting a triggering event (e.g., a user turns on the air conditioning), at scheduled intervals, or a combination of the above.

At step 310 the environment station receives the indication of the current state from the electricity relay. The environment station may receive indications from a number of electricity relays distributed throughout a building (e.g., a single building, multiple buildings, a campus, one or more offices of a business, etc.) for which the environment station may be controlling or managing the power consumption. The environment station may receive the indications from the electricity relays over any of a variety of different wired or wireless communication technologies and/or protocols. For example, the indications may be received over a local area network, a fiber-optic network, an Ethernet network, a Wi-Fi network, a proprietary network used specifically by the environment station and the electricity relays, or any other wired or wireless network or protocol.

At step 315 the received indications are sorted. The indications may be sorted in an increasing or decreasing order. For example, if the environment station is managing the power consumption for laptops, the indications of the current states of the laptop's batteries may be sorted such that the batteries with the lowest charge are at the top of the list and batteries with the greatest charge are at the bottom of the list, or vice versa. As another example, if the environment station is managing the power consumption for water heaters or HVAC units, the indications of the current states may be sorted such that the units with the greatest differential between a desired temperature and the current temperature are at the top of the list and those with the smallest differential between the current temperature and the set temperature are at the bottom of the list, or vice versa.

At step 320 the environment station receives a power rate. The power rate may be associated with a cost of power from a power company. Depending on the power company, the power rate may comprise two different values. One value may be the power rate which may comprise the monetary cost per kilowatt hour of power consumed by the devices within the building. Another value may be a demand rate which may be the monetary cost per kilowatt based on the peak amount of power consumed during a control interval, billing cycle, or some other period of time. That is, power may be more expensive for a building that consumed ten thousand kilowatts at its peak versus a building that consumed one thousand kilowatts at its peak. The power rate may vary over time based on any of a number of factors. For example, the power rate may increase as the power company experiences an increase in overall power consumption by its customers. As another example, the power company may increase the power rate when its source of power generation is reduced (e.g., if the power company relies on wind power, on a non-windy day the power rate may be higher). As another example, the power rate may vary depending on the time of day and the amount of power consumed by the building. In some embodiments, the environment station may attempt to reduce the amount of power being used by the controlled devices so as to keep the peak demand usage low to avoid increasing the demand rate.

At step 325 a threshold state is determined by the environment station. The threshold state may be determined so as to minimize an electricity bill using an objective function. The threshold state may, in essence, be determined so as to shift the amount of power consumed during times of higher power rates to times when the power rate is lower. The threshold may also be determined to reduce the power consumption as the building's power consumption approaches and/or exceeds a peak value. This may be done to avoid increasing a peak demand amount.

In some embodiments, the threshold state may include two thresholds, an upper threshold and a lower threshold. The upper threshold may be based on the state at which the device no longer needs to receive power (e.g., the battery is sufficiently charged to run the laptop for a period of time). The lower threshold may be based on the point at which power needs to flow to the device (e.g., the battery's charge is low enough that the laptop may shutdown within a relatively short period of time). The lower threshold may be a safety mechanism such that regardless of the power rate or consumption of power by the building, any device having a state below the lower threshold will receive power. Between the upper threshold and the lower threshold may be a state where the environment station may select devices at random, or based on varying factors, to have the flow of power to the device shut off. Because the state associated with the device is above the lower threshold, it may not be critical that the device receives power. In some embodiments, the threshold state may be set so that a certain number of devices fall above or below the upper or lower threshold. This may be facilitated by the list sorted at step 315.

At step 330 a control request is transmitted. The control request may indicate whether the electricity relay is to stop or allow power to flow to the device. The control request may be transmitted individually to specific electricity relays depending on the threshold state determined at step 325. For example, the environment station may compare the plurality of current states received from the electricity relays with the threshold state. It may then select devices that are above an upper threshold, above a single threshold, or between two thresholds. The environment station may then transmit control requests to the electricity relays of the selected devices requesting that the electricity relays stop the flow of power to their respective devices. In some embodiments, where there are several devices for which power is to be turned off (e.g., where there are multiple devices above the determined threshold state) the control request may be transmitted in a staggered fashion so that several electricity relays are not simultaneously stopping the flow of power. This may prevent having to simultaneously provide power to all those devices at a later time. The control requests may be sent using the same communication standard or medium that was used to receive the indication of the current state at step 310.

In the depicted scenario, it has been determined the electricity relay is to stop the flow of power to its associated device. For example, it may have been determined that the device is above a threshold state and that it may be possible to stop the flow of power to the device without impacting (within acceptable limits) the performance of the device. Based on this determination, the control request sent at step 330 may include a request that the electricity relay stop the flow of power to the device. At step 335 the flow of power is stopped. In other scenarios, the message sent from the environment station may be one that requests the electricity relay to allow, limit, or reduce the flow of power to the device. In such scenarios, step 335 may comprise allowing, limiting, or reducing the flow of power to the device. For example, once the device stops receiving power, its state will begin to drop over time. After the state falls below a threshold, the control request transmitted at step 330 may be to allow power to flow to the device. Then, at step 335 the electricity relay may allow power to flow to the device.

At step 340, an override request is received. The override request may be received automatically (e.g., based on an operation mode of the device) or manually (e.g., based on a command entered by a user). For example, in some embodiments a user, or the device, may receive a message indicating that the power to the device is about to be turned off. The user or device may then enter an override request to keep the power flowing to the device.

The steps depicted in FIG. 3 are just an example of one embodiment. Other embodiment may have different steps arranged in a different order. For example, the control request sent at step 330 may request that power be allowed to flow to the device. Accordingly, step 335 may allow the flow of power to the device rather than stopping the flow of power, as illustrated in the depicted scenario. The depicted method comprises only a single iteration. In practice, the steps in FIG. 3 may be repeated in a continuous loop. Each loop that is repeated may comprise only a subset of the steps illustrated in FIG. 3.

Figure 4:
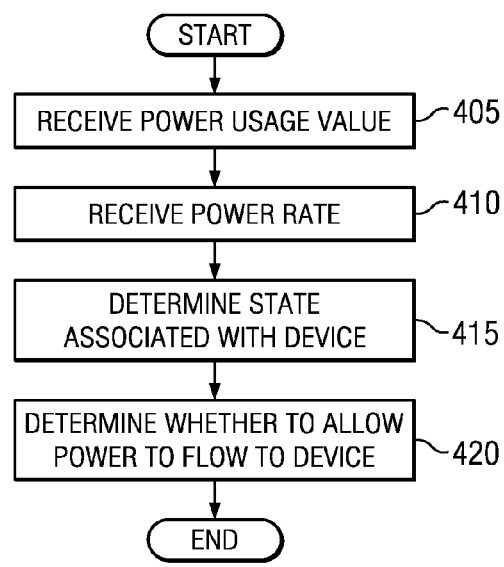
FIGS. 3-5 illustrate three different methods for managing power consumption, in accordance with particular embodiments.

FIG. 4 depicts a method for managing power in a distributed configuration, in accordance with particular embodiments. The steps depicted in FIG. 4 include steps performed by an electricity relay. The electricity relay may be responsible for controlling the flow of power to a corresponding device. The electricity relay may be one of several electricity relays within a building. Each electricity relay may operate independent of the other electricity relays. In some embodiments, the electricity relays may communicate amongst themselves to better manage the power consumption of the building. The device for which the electricity relays control the flow of power may comprise an appliance such as HVAC unit or a water heater, a laptop, an uninterruptable power supply, or any other device capable of storing energy.

The method begins at step 405 where a power usage value is received. The power usage value may be indicative of an amount of power consumed by a plurality of devices. In some embodiments, the power usage value may also include the amount of power consumed by a subset of the plurality of devices. A subset of the plurality of devices may include the devices for which an electricity relay is configured to control the flow of power. These devices may include devices for whom power is being managed (e.g., devices that are connected to an electricity relay) and/or devices that are not being managed (e.g., devices that are not connected to an electricity relay). In some embodiments, the power usage value may be reflective of the entire power consumption of the building within which the electricity relays, environment station, and devices are located.

At step 410 a power rate is received by the electricity relay. As discussed above, the power rate may include an power rate as well as a demand rate. In some embodiments, the power rate may be received from an environment station, such as environment station 150 or environment station 220. In particular embodiments, the power rate may be received from the power company (e.g., via the Internet).

At step 415 a state associated with the device is determined. In some embodiments, the state may be determined from a message or other information received from the device. In some embodiments, the state associated with the device may be determined by the electricity relay. For example, the electricity relay may be integrated into the corresponding device. In such an embodiment, electricity relay may be able to use sensors within the device to determine the state of the device. As another example, the electricity relay may monitor the flow of power to the device in order to determine the state associated with the device.

At step 420 the electricity relay determines whether to allow power to flow to the device. This may be determined based on the power usage value, the power rate, and the current state associated with the device.

The steps depicted in FIG. 4 are just an example of one embodiment. Other embodiment may have different steps arranged in a different order. The depicted method comprises only a single iteration. In practice, the steps in FIG. 4 may be repeated in a continuous loop. Each loop that is repeated may comprise only a subset of the steps illustrated in FIG. 4.

Figure 5:
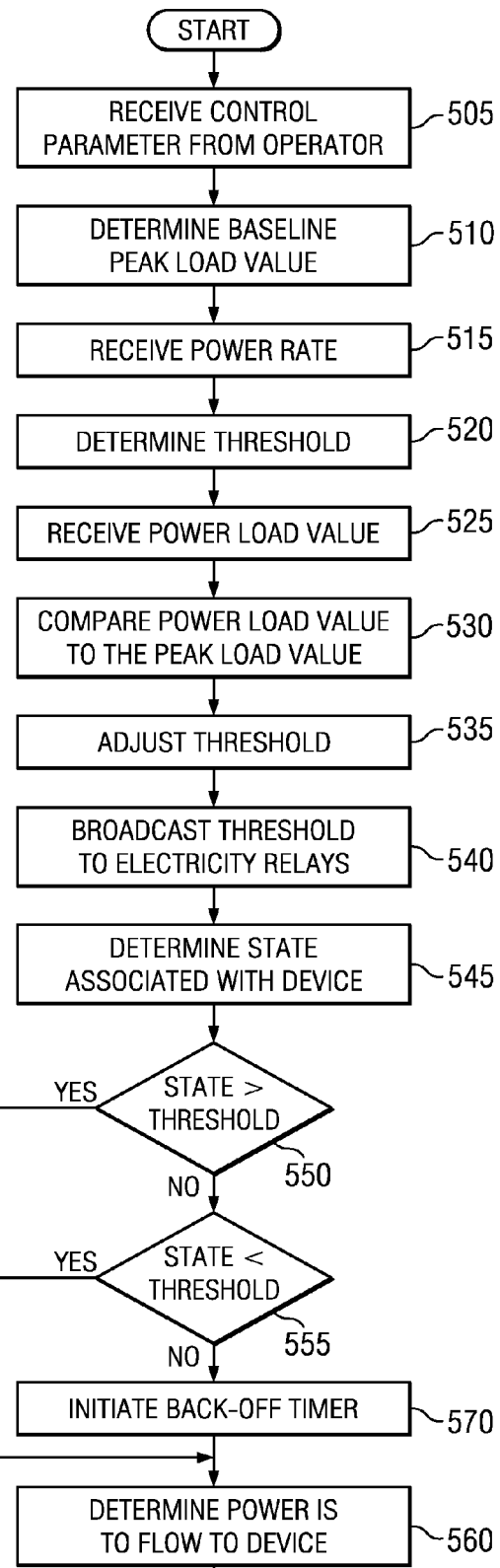

FIG. 5 depicts a flow chart for a method of managing power in a hybrid configuration, in accordance with particular embodiments. The depicted method includes steps performed by both an environment station and an electricity relay.

The method begins at step 505 with the environment station receiving a control parameter from an operator. The operator may be a person responsible for the power consumption of a building. The control parameter may be thought of as an adjustable knob which allows the operator to increase or decrease the aggressiveness with which the environment station reduces power consumption within the building. In some embodiments, the control parameter may be pre-programmed into the environment station. In some embodiments, the control parameter may be received when the environment station is initially being configured. In particular embodiments, the control parameter may be received at various times during the operation of the environment station. Although it is depicted as the first step in FIG. 5, the control parameter may be received at any point during the method. Moreover, one or more of the steps depicted in FIG. 5 may be repeated multiple times without receiving another control parameter. For example, the control parameter may be received when the environment station is first initialized, and subsequently steps 510 through 575 may be executed several times. After a month, the operator may decide to updates the control parameter and step 505 may be performed at that time.

At step 510 a baseline peak load value is determined. The baseline peak load value may be based on a desired peak amount of power consumed by the building within a given period. For purposes of this method, it may be assumed that the given period is a single billing cycle. The baseline peak load value may be a predetermined or preset target peak load value. For example, an operator may decide what peak value they want to use in order to limit their demand rate charge. In some embodiments, the baseline peak load value may be based on a previous peak value within the current billing cycle. For example, when the power load of the building exceeds the current baseline peak load value, the baseline peak load value may be determined to be the current power load. The baseline peak load value may be used by the environment station in determining when, and to what extent, to reduce power consumption by the building. For example, the environment station may begin reducing power consumption before the current power load reaches the baseline peak load value to reduce the likelihood or extent that the power load of the building exceeds the baseline peak load value. This may help the building avoid incurring an increase to the demand rate.

At step 515 the environment station receives power rate information. As in the previous methods discussed above, the power rate information may include both an power rate and a demand rate. The power rate information may be received from a utility company through any suitable wireless or wired communication means.

At step 520 a threshold is determined. As discussed above, depending on the embodiment, the threshold may comprise a single threshold or a pair of thresholds comprising an upper threshold and a lower threshold. Whether it is a single threshold or a pair of thresholds, the threshold value may be based on at least the control parameter and the power rate. In some embodiments, the lower the control parameter, the more aggressive the environment station may be in reducing the amount of power consumed by the building. For example, lowering the control parameter may lower one or more thresholds. The lower threshold may result in electricity relays stopping the flow power to their corresponding devices sooner and/or more often. In particular embodiments, the threshold may be modified based on changes to the power rate. For example, an increase in the power rate may result in the environment station lowering the threshold to more aggressively reduce the amount of power consumed by the building.

At step 525 a power load value is received. The power load value may be received from one or more meters associated with the building. The power load value may be indicative of the amount of power being consumed by the building. The power load value may comprise one or two values that indicate the amount of power consumed by devices managed by the environment station and/or devices not managed by the environment station. In some embodiments, the power load value may be used to determine whether the building is approaching or has surpassed the baseline peak load value. In some embodiments, the environment station may predict the power load value based on a received load message. For example, if the environment station receives a load message indicating that the air conditioning is about to turn on, the environment station may determine that a new peak value may be expected. In some embodiments, the environment station may receive weather information from a weather information provider, such as weather information provider 140. The information may forecast hot weather for the day. Based on this information the environment station may determine that it is going to be using an increased amount of power to run the HVAC unit and thus may be more aggressive in reducing the power used by, for example, laptops.

At step 530 the power load value is compared to the baseline peak load value. This comparison may be done to determine whether the building is approaching or has already surpassed the peak load value. An increase in the peak load value may cause an increase in the demand rate. In some embodiments, the demand rate may be divided into different levels, each level having a range of peak power consumption and a corresponding charge. In such an instance, the environment station may exceed the baseline peak value by a certain amount as long as it does not rise into the next level.

At step 535 the threshold is adjusted. In certain embodiments, the amount of the adjustment may be determined based on the comparison at step 530. For example, if the power load value has exceeded the baseline peak load value, the threshold may be lowered.

Alternatively, if the power load value is below the baseline peak load value, the threshold may be raised. In some embodiments, the amount with which the threshold is lowered at any given time may be greater than the amount by which the threshold is raised at any given time.

At step 540 the threshold is broadcast to the electricity relays. Because the threshold is a global threshold, each electricity relay may receive the same threshold or thresholds. Each of the plurality of electricity relays may use the received threshold to individually control the flow of power to their respective device. The threshold value may be broadcast using any of a variety of techniques. For example, the threshold may be broadcast over a local area network, a wireless network, or a proprietary network created between the environment station and the plurality of electricity relays.

At step 545 a state associated with the corresponding device is determined by each respective electricity relay. The state may be determined based on a message received from the corresponding device. For example, if a corresponding device is a laptop, the laptop may send the electricity relay a message indicating the state of its battery (e.g., the charge of the battery). As another example, the electricity relay may be integrated into the corresponding device. This may allow the electricity relay to determine the state associated with the device based on the sensors and other components of the device. The state of the device may be indicative of the amount of energy currently stored by the device. For example, if the device is a laptop, the state may be indicative of the charge of the laptop's battery. The state may be based on the percentage of the charge remaining, the length of time the laptop can run using only the battery, or any other indicator of the amount of energy stored by the laptop's battery. As another example, if the device is an HVAC unit, a water heater or any other device capable of storing thermal energy, the state may be based on a current temperature (e.g., of a room or the water), a difference between the current temperature and an ideal or set temperature, how long the device can maintain the current temperature or remain within a certain number of degrees of the set temperature, or any other indicator of the amount of stored thermal energy. For example, based on the rate at which the temperature changes within the device, the device may determine how long it can maintain the current temperature or how long it can keep the temperature above or below a certain temperature.

At decision step 550, the electricity relay compares the current state to an upper threshold state to determine whether or not the current state is greater than the upper threshold state. If the current state is greater than the upper threshold state the method continues to step 565 where the electricity relay stops the flow of power to the device. If the current state is less than the upper threshold, then the method continues to decision step 555 to determine if the current state is less than a lower threshold.

At step 565, the electricity relay determines that power is not to flow to the device. In particular, because the current state is greater than the threshold state, the corresponding device may be able to operate within acceptable parameters without receiving power. Over time, as the current state of the device decreases, it may eventually be determined that power needs to flow to the device. In other words, because power is not flowing to the device, the state of the device may, over time, decrease until its state is below one or both thresholds and it is determined, at step 560, that power is to flow to the device.

At decision step 555, the electricity relay determines whether the current state is less than a lower threshold. The lower threshold used at step 555 may be lower than the upper threshold used at step 550. If the current state is less than the lower threshold, then the method continues to step 560 where power is allowed to flow to the device. If it is determined that the current state is above the lower threshold (and below the upper threshold) then the method continues to step 570 where a back-off timer is initiated. The lower threshold may act as a failsafe to ensure that a device below the lower threshold receives power and the device is able to continue to operate within acceptable parameters.

At step 570, a back-off timer is initiated. The back-off timer may be initiated in order to prevent several devices from simultaneously allowing power to flow to their respective devices. For example, when an operator changes the control parameter, several devices may suddenly find themselves having a current state that is between the two threshold values. Rather than having several electricity relays simultaneously allowing power to flow to the devices, each electricity relay associated with a device between the two thresholds may initiate their own unique back-off timer. This may result in the electricity relays allowing power to flow to the devices in a staggered fashion. This may help prevent increasing the peak load of the building. In certain embodiments, such as the one depicted in FIG. 5, the back-off time is used when the current state is between the two thresholds. In some embodiments that only use one threshold, the back-off timer may be used any time the current state is below the threshold. In some embodiments, the length of time of the back-off timer may vary for a particular device based on the current state of the device.

At step 560 it is determined that power is to be allowed to flow to the device. This may be done where the current state is less than both the thresholds, or after the back-off timer initiated at step 570 has expired. Allowing power to flow without waiting for a back-off timer when the current state is less than the lower threshold state may be a failsafe to avoid having a device operate under unacceptable parameters because of a lack of power. Once power begins to flow to the device, the current state will begin to rise. At some point the current state will be greater than the upper threshold and it will be determined that power no longer needs to flow to the device.

The steps depicted in FIG. 5 are just an example of one embodiment. Other embodiment may have different steps arranged in a different order. For example, in some embodiments, only a single threshold may be used as opposed to the two thresholds used in steps 550 and 555. In such an embodiment, electricity relays either may have a back-off timer that is set short enough and a threshold that is set high enough such that there is little risk of the back-off timer continuing to run after the device reaches the critical state in which it can no longer operate within acceptable parameters. In some embodiments, when only one threshold is used, no back-off timer may be used. That is, once the current state falls below the threshold state, the electricity relay may allow power to flow to the device. When the state is above the single threshold, the electricity relay may stop the flow of power to the device. As another example, in some embodiments, the method may include allowing a user of a device to provide an override request. For example, if a user is planning on unplugging their laptop from the building power supply, the user may wish to have the battery fully charged. In such a scenario, the user may provide an override request if the electricity relay stops the flow of power to the laptop. The depicted method comprises only a single iteration. In practice, the steps in FIG. 5 may be repeated in a continuous loop. Each loop that is repeated may comprise only a subset of the steps illustrated in FIG. 5.

Some of the steps illustrated in FIGS. 3-5 may be combined, modified, or deleted where appropriate, and additional steps may also be added to any of the flowcharts. For example, the override request shown in step 340 of the method illustrated in FIG. 3 may be included in either of the methods depicted in FIG. 4 or 5. Additionally, steps may be performed in any suitable order without departing from the scope of particular embodiments.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1 or FIGS. 3-5, according to operational needs or desires.

Although particular embodiments have been described in detail, it should be understood that various other changes, substitutions, and alterations may be made hereto without departing from the spirit and scope of particular embodiments. For example, although an embodiment has been described with reference to a number of elements included within electricity relay 210 and environment station 220 such as a processor, memory, storage, an interface, and a bus, these elements may be combined, rearranged or positioned in order to accommodate particular power consumption management architectures or needs. In addition, any of these elements may be provided as separate external components to electricity relay 210, environment station 220, or each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. A method in an environment station of managing power consumption for a plurality of devices located in one building, each of the plurality of devices associated with an electricity relay, the method comprising:
   receiving from a plurality of electricity relays an indication of a current stored energy level associated with each of the plurality of electricity relays, the plurality of electricity relays comprising a distributed storage that coordinates transmitting energy levels to the plurality of devices;
   receiving a power rate associated with a cost of power;
   determining a threshold energy level based on the power rate and the current stored energy level associated with each of the plurality of electricity relays, the threshold energy level representing a threshold stored energy level;
   transmitting the determined threshold energy level to one or more of the plurality of electricity relays, wherein the one or more of the plurality of electricity relays determines whether to allow power to flow through the first electricity relay based on the threshold energy level and a first current stored energy level associated with the first electricity relay;
   monitoring an aggregate power consumed by the building;
   determining the aggregate power consumed by the building is near a peak load threshold; and
   adjusting the determined threshold energy level to reduce the aggregate power consumed by the building.

2. The method of claim 1, wherein:
   the electricity relay is configured to control the flow of power to charge a battery; and
   the current stored energy level comprises a state of charge of the battery.

3. The method of claim 1, further comprising:
   sorting the current stored energy level associated with each of the plurality of electricity relays; and
   wherein the order of transmitting the determined threshold energy level to one or more of the plurality of electricity relays is based on the sorting of the current stored energy level associated with each of the plurality of electricity relays.

4. The method of claim 1, wherein determining a threshold energy level based on the power rate and the current stored energy level associated with each of the plurality of electricity relays comprises determining a threshold energy level that minimizes an electricity bill using an objective function.

5. The method of claim 1, wherein determining a threshold energy level based on the power rate and the current stored energy level associated with each of the plurality of electricity relays comprises determining a lower threshold energy level and an upper threshold energy level for each of the plurality of electric relays based on the power rate and the current stored energy level associated with each of the plurality of electricity relays.

6. The method of claim 1, wherein:
the electricity relay is configured to control the flow of power to an appliance; and
the current stored energy level comprises a temperature associated with the appliance.

7. A method of managing power consumption for a plurality of devices, each of the plurality of devices located in one building and associated with an electricity relay, the method comprising:
generating, at an electricity relay, an indication of a current stored energy level associated with a device, the electricity relay comprising a distributed storage that coordinates transmitting energy levels to the plurality of devices;
transmitting the indication of the current stored energy level associated with the device to an environment station configured to manage power consumption for a plurality of devices;
receiving, at the electricity relay, a threshold energy level;
determining, at the electricity relay, whether to allow power to flow to the device based on the received threshold energy level and the current stored energy level, wherein the threshold energy level represents a threshold stored energy level, and the threshold energy level is based on a power rate and a plurality of current stored energy levels associated with each of the plurality of devices
monitoring an aggregate power consumed by the building;
determining the aggregate power consumed by the building is near a peak load threshold; and
adjusting the threshold energy level to reduce the aggregate power consumed by the building.

8. The method of claim 7, wherein:
the device comprises a battery; and
generating an indication of a current stored energy level associated with the device comprises generating an indication of a state of charge of the battery.

9. The method of claim 7, further comprising receiving an override request configured to override the control request.

10. The method of claim 7, wherein generating and transmitting the indication of the current stored energy level associated with the device comprises generating and transmitting the indication of the current stored energy level associated with the device on a periodic basis.

11. The method of claim 7, wherein:
the device comprises an appliance; and
generating an indication of a current stored energy level associated with the device comprises generating an indication of a thermal state of the appliance.

12. A method of managing power consumption for a plurality of devices, each of the plurality of devices located in one building and associated with an electricity relay, the method comprising:
monitoring an aggregate power consumed by the building;
determining the aggregate power consumed by the building is near a peak load threshold;
receiving, at an electricity relay, at least one power usage value from an environment station, the power usage value indicative of an amount of power consumed by a plurality of devices, the electricity relay comprising a distributed storage that coordinates transmitting energy levels to the plurality of devices;
receiving, at the electricity relay, a power rate associated with a cost of power;
determining, at the electricity relay, a stored energy level associated with a first device of the plurality of devices;
determining, at the electricity relay, whether to allow power to flow to the first device based on the power usage value, the power rate, and the stored energy level associated with the first device; and
adjusting the determined power flow to the first device to reduce the aggregate power consumed by the building;
wherein the power usage value comprises:
an overall power usage associated with the amount of power consumed by the plurality of devices; and
a subset power usage associated with the amount of power consumed by a subset of the plurality of devices, the subset of the plurality of devices comprising the first device.

13. The method of claim 12, wherein:
the first device comprises a battery; and
the stored energy level associated the first device comprises a charge state associated with the battery.

14. The method of claim 12, wherein determining a stored energy level associated with a first device of the plurality of devices comprises receiving a message from the first device, the message comprising information indicative of the stored energy level associated with the first device.

15. The method of claim 12, wherein:
the first device comprises an appliance; and
the stored energy level associated with the first device comprises a temperature associated with the appliance.

16. A method in an environment station of managing power consumption for a plurality of devices located in one building, each of the plurality of devices associated with an electricity relay, the method comprising:
receiving a control parameter, the control parameter indicative of a desired environmental state;
receiving a power rate associated with a cost of power;
determining a first threshold energy level based on the control parameter and the power rate, the first threshold energy level representing a threshold stored energy level;
broadcasting the first threshold energy level to a plurality of electricity relays, each electricity relay associated with at least one device and configured to control the flow of power to the at least one device based on the first threshold energy level and a stored energy level associated with the at least one device, the plurality of electricity relays comprising a distributed storage that coordinates transmitting energy levels to the plurality of devices;
monitoring an aggregate power consumed by the building;
determining the aggregate power consumed by the building is near a peak load threshold; and adjusting the determined first threshold energy level to reduce the aggregate power consumed by the building.

17. The method of claim 16, further comprising determining a second threshold energy level based on the control parameter and the power rate, the first threshold energy level indicative of when to stop the flow of power to the at least one device and the second threshold energy level indicative of when to start the flow of power to the at least one device.

18. The method of claim 16, further comprising:
determining a baseline peak load value;
receiving a load message indicative of a power load value;
comparing the power load value to the peak load value;
if the power load value is less than the peak load value, adjusting the first threshold energy level by a first amount; and
if the power load value is greater than or equal to the peak load value, adjusting the first threshold energy level by a second amount.

19. The method of claim 18, further comprising predicting the power load value based on the received load message.

20. The method of claim 16, wherein each electricity relay of the plurality of electricity relays is configured to control the flow of power to a battery.

21. The method of claim 16, wherein each electricity relay of the plurality of electricity relays is configured to control the flow of power to an appliance.

22. A method of managing power consumption for a plurality of devices, each of the plurality of devices located in one building and associated with an electricity relay, the method comprising:
receiving, at an electricity relay, a first threshold energy level value from an environment station, the first threshold energy level value broadcast from the environment station to a plurality of electricity relays, and the first threshold energy level representing a threshold stored energy level, the plurality of electricity relays comprising a distributed storage that coordinates transmitting energy levels to the plurality of devices;
determining, at the electricity relay, a stored energy level associated with a device;
comparing the stored energy level associated with the device with the first threshold energy level value from the environment station;
determining, at the electricity relay, whether to allow power to flow to the device based on the comparison;
monitoring an aggregate power consumed by the building;
determining the aggregate power consumed by the building is near a peak load threshold; and
adjusting the threshold energy level to reduce the aggregate power consumed by the building.

23. The method of claim 22, further comprising:
receiving a second threshold energy level value from the environment station, the second threshold energy level value broadcast from the environment station to the plurality of electricity relays; and
comparing the stored energy level associated with the device with the second threshold energy level value from the environment station;
wherein determining whether to allow power to flow to the device based on the comparison comprises:
if the stored energy level associated with the device is greater than the first threshold energy level value, determining that power is not to flow to the device;
if the stored energy level associated with the device is less than the first threshold energy level value and greater than the second threshold energy level value:
initiating a back-off timer configured to run for a period of time; and
determining that power is to flow to the device after the period of time; and
if the stored energy level associated with the device is less than the second threshold energy level value, determining that power is to flow to the device.

24. The method of claim 22, wherein:
determining a stored energy level associated with a device comprises determining a charge state associated with the device; and
determining whether to allow power to flow to the device comprises determining whether to allow power to flow to a battery associated with the device to charge the battery.

25. The method of claim 22, wherein:
determining a stored energy level associated with a device comprises determining a temperature energy level associated with the device; and
determining whether to allow power to flow to the device comprises determining whether to allow power to flow to an appliance to change the temperature energy level associated with the device.

26. A non-transitory computer readable medium comprising logic that when executed by a computer is configured to:
receive from a plurality of electricity relays an indication of a current stored energy level associated with each of the plurality of electricity relays, the plurality of electricity relays comprising a distributed storage that coordinates transmitting energy levels to a plurality of devices located in one building;
receive a power rate associated with a cost of power;
determine a threshold energy level based on the power rate and the current stored energy level associated with each of the plurality of electricity relays, the threshold energy level representing a threshold stored energy level;
transmit the determined threshold energy level to one or more of the plurality of electricity relays, wherein the one or more of the plurality of electricity relays determines whether to allow power to flow through the first electricity relay based on the threshold energy level and a first current stored energy level associated with the first electricity relay;
monitor an aggregate power consumed by the building;
determine the aggregate power consumed by the building is near a peak load threshold; and
adjust the determined threshold energy level to reduce the aggregate power consumed by the building.

27. The medium of claim 26, wherein:
the electricity relay is configured to control the flow of power to charge a battery; and
the current stored energy level comprises a state of charge of the battery.

28. The medium of claim 26, wherein:
the logic is further configured to sort the current stored energy level associated with each of the plurality of electricity relays; and
the order of transmitting the determined threshold energy level to one or more of the plurality of electricity relays is based on the sorting of the current stored energy level associated with each of the plurality of electricity relays.

29. The medium of claim 26, wherein the logic configured to determine a threshold energy level based on the power rate and the current stored energy level associated with each of the plurality of electricity relays is further configured to determine a threshold energy level that minimizes an electricity bill using an objective function.

30. The medium of claim 26, wherein the logic configured to determine a threshold energy level based on the power rate and the current stored energy level associated with each of the plurality of electricity relays is further configured to determine a lower threshold energy level and an upper threshold energy level for each of the plurality of electric relays based on the power rate and the current stored energy level associated with each of the plurality of electricity relays.

31. The medium of claim 26, wherein:
the electricity relay is configured to control the flow of power to an appliance; and
the current stored energy level comprises a temperature associated with the appliance.

32. A non-transitory computer readable medium comprising logic that when executed by a computer is configured to:
generate an indication of a current stored energy level associated with a device, the device comprising a distributed storage that coordinates transmitting energy levels to a plurality of devices located in one building;
transmit the indication of the current stored energy level associated with the device to an environment station configured to manage power consumption for the plurality of devices;
receive a threshold energy level from the environment station;
determine whether to allow power to flow to the device based on the received threshold energy level and the current stored energy level, wherein the threshold energy level represents a threshold stored energy level, and the threshold energy level is based on a power rate and a plurality of current stored energy levels associated with each of the plurality of devices;
monitor an aggregate power consumed by the building;
determine the aggregate power consumed by the building is near a peak load threshold; and
adjust the threshold energy level to reduce the aggregate power consumed by the building.

33. The medium of claim 32, wherein:
the device comprises a battery; and
the logic configured to generate an indication of a current stored energy level associated with the device comprises logic configured to generate an indication of a state of charge of the battery.

34. The medium of claim 32, wherein the logic is further configured to receive an override request configured to override the control request.

35. The medium of claim 32, wherein the logic configured to generate and transmit the indication of the current stored energy level associated with the device is further configured to generate and transmit the indication of the current stored energy level associated with the device on a periodic basis.

36. The medium of claim 32, wherein:
the device comprises an appliance; and
the logic configured to generate an indication of a current stored energy level associated with the device is further configured to generate an indication of a thermal state of the appliance.

37. A non-transitory computer readable medium comprising logic that when executed by a computer is configured to:
monitor an aggregate power consumed by a building;
determine the aggregate power consumed by the building is near a peak load threshold; and
receive at least one power usage value from an environment station, the power usage value indicative of an amount of power consumed by a plurality of devices located in the building;
receive a power rate associated with a cost of power;
determine a stored energy level associated with a first device of the plurality of devices, the first device comprising a distributed storage that coordinates transmitting energy levels to the plurality of devices;
determine whether to allow power to flow to the first device based on the power usage value, the power rate, and the stored energy level associated with the first device; and
adjust the determined power flow to the first device to reduce the aggregate power consumed by the building;
wherein the power usage value comprises:
an overall power usage associated with the amount of power consumed by the plurality of devices; and
a subset power usage associated with the amount of power consumed by a subset of the plurality of devices, the subset of the plurality of devices comprising the first device.

38. The medium of claim 37, wherein:
the first device comprises a battery; and
the stored energy level associated with the first device comprises a charge state associated with the battery.

39. The medium of claim 37, wherein the logic configured to determine a stored energy level associated with a first device of the plurality of devices is further configured to receive a message from the first device, the message comprising information indicative of the stored energy level associated with the first device.

40. The medium of claim 37, wherein:
the first device comprises an appliance; and
the stored energy level associated with the first device comprises a temperature associated with the appliance.

41. A non-transitory computer readable medium comprising logic that when executed by a computer is configured to:
receive a control parameter, the control parameter indicative of a desired environmental state;
receive a power rate associated with a cost of power;
determine a first threshold energy level based on the control parameter and the power rate, the first threshold energy level representing a threshold stored energy level;
broadcast the first threshold energy level to a plurality of electricity relays, each electricity relay associated with at least one device and configured to control the flow of power to the at least one device based on the first threshold energy level and a stored energy level associated with the at least one device, the plurality of electricity relays comprising a distributed storage that coordinates transmitting energy levels to a plurality of devices located in one building;
monitor an aggregate power consumed by the building;
determine the aggregate power consumed by the building is near a peak load threshold; and
adjust the determined first threshold enemy level to reduce the aggregate power consumed by the building.

42. The medium of claim 41, wherein the logic is further configured to determine a second threshold energy level based on the control parameter and the power rate, the first threshold energy level indicative of when to stop the flow of power to the at least one device and the second threshold energy level indicative of when to start the flow of power to the at least one device.

43. The medium of claim 41, wherein the logic is further configured to:
determine a baseline peak load value;
receive a load message indicative of a power load value;
compare the power load value to the peak load value;

if the power load value is less than the peak load value, adjust the first threshold energy level by a first amount; and if the power load value is greater than or equal to the peak load value, adjust the first threshold energy level by a second amount.

44. The medium of claim 43, wherein the logic is further configured to predict the power load value based on the received load message.

45. The medium of claim 41, wherein each electricity relay of the plurality of electricity relays is configured to control the flow of power to a battery.

46. The medium of claim 41, wherein each electricity relay of the plurality of electricity relays is configured to control the flow of power to an appliance.

47. A non-transitory computer readable medium comprising logic that when executed by a computer is configured to:
receive a first threshold energy level value from an environment station, the first threshold energy level value broadcast from the environment station to a plurality of electricity relays, and the first threshold energy level representing a threshold stored energy level, the plurality of electricity relays comprising a distributed storage that coordinates transmitting energy levels to a plurality of devices located in one building;
determine a stored energy level associated with a device;
compare the stored energy level associated with the device with the first threshold energy level value from the environment station;
determine whether to allow power to flow to the device based on the comparison;
monitor an aggregate power consumed by the building;
determine the aggregate power consumed by the building is near a peak load threshold; and
adjust the threshold energy level to reduce the aggregate power consumed by the building.

48. The medium of claim 47:
wherein the logic is further configured to:
receive a second threshold energy level value from the environment station, the second threshold energy level value broadcast from the environment station to the plurality of electricity relays; and
compare the stored energy level associated with the device with the second threshold energy level value from the environment station;
wherein the logic configured to determine whether to allow power to flow to the device based on the comparison is further configured to:
if the stored energy level associated with the device is greater than the first threshold energy level value, determine that power is not to flow to the device;
if the stored energy level associated with the device is less than the first threshold energy level value and greater than the second threshold energy level value:
initiate a back-off timer configured to run for a period of time; and
determine that power is to flow to the device after the period of time; and
if the stored energy level associated with the device is less than the second threshold energy level value, determine that power is to flow to the device.

49. The medium of claim 47, wherein:
the logic configured to determine a stored energy level associated with a device is further configured to determine a charge state associated with the device; and
the logic configured to determine whether to allow power to flow to the device is further configured to determine whether to allow power to flow to a battery associated with the device to charge the battery.

50. The medium of claim 47, wherein:
the logic configured to determine a stored energy level associated with a device is further configured to determine a temperature energy level associated with the device; and
the logic configured to determine whether to allow power to flow to the device is further configured to determine whether to allow power to flow to an appliance to change the temperature energy level associated with the device.

51. An apparatus for managing power consumption for a plurality of devices, each of the plurality of devices located in one building and associated with an electricity relay, the apparatus comprising:
an interface configured to:
receive from a plurality of electricity relays an indication of a current stored energy level associated with each of the plurality of electricity relays, the plurality of electricity relays comprising a distributed storage that coordinates transmitting energy levels to the plurality of devices; and
receive a power rate associated with a cost of power; and
a processor coupled to the interface and configured to determine a threshold energy level based on the power rate and the current stored energy level associated with each of the plurality of electricity relays, the threshold energy level representing a threshold stored energy level;
the interface further configured to
transmit the determined threshold energy level to one or more of the plurality of electricity relays, wherein the one or more of the plurality of electricity relays determines whether to allow power to flow through the first electricity relay based on the threshold energy level and a first current stored energy level associated with the first electricity relay;
monitor an aggregate power consumed by the building;
determine the aggregate power consumed by the building is near a peak load threshold; and
adjust the determined threshold energy level to reduce the aggregate power consumed by the building.

52. The apparatus of claim 51, wherein:
the electricity relay is configured to control the flow of power to charge a battery; and
the current stored energy level comprises a state of charge of the battery.

53. The apparatus of claim 51, wherein:
the processor is further configured to sort the current stored energy level associated with each of the plurality of electricity relays; and
the order of transmitting the determined threshold energy level to one or more of the plurality of electricity relays is based on the sorting of the current stored energy level associated with each of the plurality of electricity relays.

54. The apparatus of claim 51, wherein the processor configured to determine a threshold energy level based on the power rate and the current stored energy level associated with each of the plurality of electricity relays is further configured to determine a threshold energy level that minimizes an electricity bill using an objective function.

55. The apparatus of claim 51, wherein the processor configured to determine a threshold energy level based on the power rate and the current stored energy level associated with each of the plurality of electricity relays is further configured to determine a lower threshold energy level and an upper threshold energy level for each of the plurality of electric relays based on the power rate and the current stored energy level associated with each of the plurality of electricity relays.

56. The apparatus of claim 51, wherein:
the electricity relay is configured to control the flow of power to an appliance; and
the current stored energy level comprises a temperature associated with the appliance.

57. An apparatus for managing power consumption, the apparatus comprising:
a processor configured to generate an indication of a current stored energy level associated with a device; and
an interface coupled to the processor and configured to:
transmit the indication of the current stored energy level associated with the device to an environment station configured to manage power consumption for a plurality of devices located in one building; and
receive, from the environment station, a threshold energy level; and
the processor further configured to determine whether to allow power to flow to the device based on the received threshold energy level and the current stored energy level, wherein the threshold energy level represents a threshold stored energy level, and the threshold energy level is based on a power rate and a plurality of current stored energy levels associated with each of the plurality of devices, the device comprising a distributed storage that coordinates transmitting energy levels to the plurality of devices;
the interface further configured to:
monitor an aggregate power consumed by the building;
determine the aggregate power consumed by the building is near a peak load threshold; and
adjust the threshold energy level to reduce the aggregate power consumed by the building.

58. The apparatus of claim 57, wherein:
the device comprises a battery; and
the interface configured to generate an indication of a current stored energy level associated with the device comprises determining a state of charge of the battery.

59. The apparatus of claim 57, wherein the interface is further configured to receive an override request configured to override the control request.

60. The apparatus of claim 57, wherein the interface configured to generate and transmit the indication of the current stored energy level associated with the device is further configured to generate and transmit the indication of the current stored energy level associated with the device on a periodic basis.

61. The apparatus of claim 57, wherein:
the device comprises an appliance; and
the interface configured to generate an indication of a current stored energy level associated with the device is further configured to generate an indication of a thermal state of the appliance.

62. An apparatus for managing power consumption, the apparatus comprising:
an interface configured to:
receive at least one power usage value from an environment station, the power usage value indicative of an amount of power consumed by a plurality of devices located in a building; and
receive a power rate associated with a cost of power;
a processor coupled to the interface and configured to:
determine a stored energy level associated with a first device of the plurality of devices, the first device comprising a distributed storage that coordinates transmitting energy levels to the plurality of devices;
determine whether to allow power to flow to the first device based on the power usage value, the power rate, and the stored energy level associated with the first device;
monitor an aggregate power consumed by the building;
determine the aggregate power consumed by the building is near a peak load threshold; and
adjust the determined power flow to the first device to reduce the aggregate power consumed by the building;
wherein the power usage value comprises:
an overall power usage associated with the amount of power consumed by the plurality of devices; and
a subset power usage associated with the amount of power consumed by a subset of the plurality of devices, the subset of the plurality of devices comprising the first device.

63. The apparatus of claim 62, wherein:
the first device comprises a battery; and
the stored energy level associated with the first device comprises a charge state associated with the battery.

64. The apparatus of claim 62, wherein the processor configured to determine a stored energy level associated with a first device of the plurality of devices is further configured to receive a message from the first device, the message comprising information indicative of the stored energy level associated with the first device.

65. The apparatus of claim 62, wherein:
the first device comprises an appliance; and
the stored energy level associated with the first device comprises a temperature associated with the appliance.

66. An apparatus for managing power consumption for a plurality of devices, each of the plurality of devices located in one building and associated with an electricity relay, the apparatus comprising:
an interface configured to:
receive a control parameter, the control parameter indicative of a desired environmental state; and
receive a power rate associated with a cost of power; and
a processor coupled to the interface and configured determine a first threshold energy level based on the control parameter and the power rate, the first threshold energy level representing a threshold stored energy level;
the interface further configured to
broadcast the first threshold energy level to a plurality of electricity relays, each electricity relay associated with at least one device;
control the flow of power to the at least one device based on the first threshold energy level and a stored energy level associated with the at least one device, the plurality of electricity relays comprising a distributed storage that coordinates transmitting energy levels to the plurality of device;
monitor an aggregate power consumed by the building;
determine the aggregate power consumed by the building is near a peak load threshold; and
adjust the first threshold energy level to reduce the aggregate power consumed by the building.

67. The apparatus of claim 66, wherein the processor is further configured to determine a second threshold energy level based on the control parameter and the power rate, the first threshold energy level indicative of when to stop the flow of power to the at least one device and the second threshold energy level indicative of when to start the flow of power to the at least one device.

68. The apparatus of claim 66:
wherein the interface is further configured to receive a load message indicative of a power load value; and
wherein the processor is further configured to:
determine a baseline peak load value;
compare the power load value to the peak load value;
if the power load value is less than the peak load value, adjust the first threshold energy level by a first amount; and
if the power load value is greater than or equal to the peak load value, adjust the first threshold energy level by a second amount.

69. The apparatus of claim 68, wherein the processor is further configured to predict the power load value based on the received load message.

70. The apparatus of claim 66, wherein each electricity relay of the plurality of electricity relays is configured to control the flow of power to a battery.

71. The apparatus of claim 66, wherein each electricity relay of the plurality of electricity relays is configured to control the flow of power to an appliance.

72. An apparatus for managing power consumption, the apparatus comprising:
an interface configured to receive a first threshold energy level value from an environment station, the first threshold energy level value broadcast from the environment station to a plurality of electricity relays, and the first threshold energy level representing a threshold stored energy level, the plurality of electricity relays comprising a distributed storage that coordinates transmitting energy levels to a plurality of devices located in one building; and
a processor coupled to the interface and configured to:
determine a stored energy level associated with a device;
compare the stored energy level associated with the device with the first threshold energy level value from the environment station;
determine whether to allow power to flow to the device based on the comparison;
monitor an aggregate power consumed by the building;
determine the aggregate power consumed by the building is near a peak load threshold; and
adjust the first threshold enemy level to reduce the aggregate power consumed by the building.

73. The apparatus of claim 72:
wherein the interface is further configured to receive a second threshold energy level value from the environment station, the second threshold energy level value broadcast from the environment station to the plurality of electricity relays;
wherein the processor is further configured to compare the stored energy level associated with the device with the second threshold energy level value from the environment station; and
wherein the processor configured to determine whether to allow power to flow to the device based on the comparison is further configured to:
if the stored energy level associated with the device is greater than the first threshold energy level value, determine that power is not to flow to the device;
if the stored energy level associated with the device is less than the first threshold energy level value and greater than the second threshold energy level value:
initiate a back-off timer configured to run for a period of time; and
determine that power is to flow to the device after the period of time; and
if the stored energy level associated with the device is less than the second threshold energy level value, determine that power is to flow to the device.

74. The apparatus of claim 72, wherein:
the processor configured to determine a stored energy level associated with a device is further configured to determine a charge state associated with the device; and
the processor configured to determine whether to allow power to flow to the device is further configured to determine whether to allow power to flow to a battery associated with the device to charge the battery.

75. The apparatus of claim 72, wherein:
the processor configured to determine a stored energy level associated with a device is further configured to determine a temperature energy level associated with the device; and
the processor configured to determine whether to allow power to flow to the device is further configured to determine whether to allow power to flow to an appliance to change the temperature energy level associated with the device.

* * * * *